(12) United States Patent
Bevacco

(10) Patent No.: US 6,250,337 B1
(45) Date of Patent: Jun. 26, 2001

(54) MECHANICAL PLUG ASSEMBLY

(75) Inventor: Marc P. Bevacco, Corcoran, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 0 days.

(21) Appl. No.: 09/467,250

(22) Filed: Dec. 20, 1999

Related U.S. Application Data

(60) Provisional application No. 60/113,029, filed on Dec. 21, 1998.

(51) Int. Cl.[7] .................................................... F16L 55/132
(52) U.S. Cl. .............................. 138/89; 138/90; 138/96 T
(58) Field of Search ........................... 138/89, 89.1, 89.2, 138/89.3, 89.4, 96 T, 90

(56) References Cited

U.S. PATENT DOCUMENTS

| D. 421,792 | 3/2000 | Bevacco . | |
|---|---|---|---|
| 2,355,492 | 8/1944 | White . | |
| 3,412,759 | 11/1968 | Potter et al. . | |
| 3,494,504 | 2/1970 | Jackson . | |
| 3,828,968 | * 8/1974 | Kask | 138/89 |
| 4,186,645 | * 2/1980 | Zaydel | 138/89 |
| 4,493,344 | 1/1985 | Mathison et al. . | |
| 4,506,705 | 3/1985 | Thompson . | |
| 4,653,540 | * 3/1987 | Epstein | 138/89 |
| 4,768,560 | * 9/1988 | Logsdon | 138/90 |
| 5,289,851 | * 3/1994 | Jorgensen | 138/89 |
| 5,353,841 | 10/1994 | Mathison et al. . | |
| 5,862,533 | 1/1999 | Johnson et al. . | |

* cited by examiner

Primary Examiner—James Hook
(74) Attorney, Agent, or Firm—Anthony G. Eggink

(57) ABSTRACT

A two piece mechanical plug assembly for sealing low pressure pipelines. The mechanical plug assembly comprises a rigid body member and a flexible, cylindrical sealing member. The rigid body member has an upper portion and a lower portion of a frustoconical configuration having a plurality of threads. The sealing member has a conical bore with a plurality of threads to receive the lower threaded portion of the rigid body member. The upper portion of the rigid body member has an upwardly extending member with opposing wing members for turning the rigid body member into the sealing member whereby the rigid body member expands the flexible sealing member for sealing engagement into the interior of a pipeline.

22 Claims, 2 Drawing Sheets

MECHANICAL PLUG ASSEMBLY

This application claims the benefit of U.S. Provisional Patent Application No. 60/113,029 filed on Dec. 21, 1998.

BACKGROUND OF THE INVENTION

The present invention relates to a mechanical plug for pipes. Particularly, the assembly of this invention relates to a two piece mechanical plug for plugging pipe ends or other pipe portions to allow easy access to the pipeline. The plug assembly of this invention is particularly useful for temporarily sealing low-pressure pipelines. The two piece plug assembly is constructed and arranged to fit various pipe constructions, i.e., PVC, ABS, copper, etc. and various pipe diameters, i.e., 1½, 2, 3 and 4 inch pipelines.

Various pipe plugs and assemblies, including mechanical plug assemblies, have been proposed and used in the past, however, each such assembly has drawbacks and limitations. Certain plugs used to seal pipe ends are difficult and costly to manufacture and to place in a pipe and/or to remove from the pipe after use. Some plugs may have to be cut off or out of the pipe to be removed, thereby destroying the plug itself, as well as potentially damaging the pipe. Other prior art pipe plugs are difficult to operate and lack sufficient sealing surfaces. Still others are constructed to deal with specific pipe sizes and do not allow for normal pipe diameter variations.

The mechanical plug assembly of this invention overcomes the shortcomings of prior art plug assemblies by providing an economical lightweight, reusable two piece mechanical plug for pipes that is easily inserted into and removed from pipelines or conduits. The plug assembly is constructed of plastic and rubber parts and does not utilize metallic portions which may corrode. The mechanical plug assembly is comprised of a rigid body member and a flexible sealing member which are joined and sealed in a pipeline by tuning the mating threads, of a predetermined thread configuration and design. The plug assembly is constructed and arranged so that it can be inserted and removed by hand, or with the assistance of a tool, such as a wrench. The plug also allows for easy access to the pipeline without damage to the plug itself or to the pipe end.

The mechanical plug assembly includes a molded rigid plastic body member which has a grasping or handle portion and a threaded sealing portion. The grasping portion is ergonomically designed and extends from the top surface of the body member and is comprised of a center grip and opposing thumb wings that allow for easy twisting and maneuvering of the body portion. The flexible sealing member is a cylindrical structure which is internally threaded in a generally cone shaped design which narrows from top to bottom. Importantly, a plurality of threads, of a specific design and configuration, are spaced external the rigid body member and internal the flexible sealing member for mating and sealing securement.

The flexible seal member of the plug assembly is generally circular in cross-section and has a cone shaped internal threaded portion. The seal member is preferably comprised of a sturdy flexible material such as rubber or the like. The seal portion is constructed and arranged to receive the threaded sealing portion of the rigid body portion to thereby radially expand the flexible seal member body. The seal member is comprised of a generally smooth outer surface, a cone shaped threaded inner surface and a top circumferential lip. The plurality of threads on the inner surface of the seal member are spaced at a predetermined distance to matingly receive the exterior threads of the rigid body member.

To seal a pipe, the seal member of the invention, having the rigid body member partially threaded therein, is place inside of the pipe or port end until the circumferential lip rests against the outer edge of the pipe port. The rigid body member of the plug assembly is then grasped by the center grip and thumb wings and further turned or threaded into the seal portion. As the threaded plug body is received by the seal member, the seal member expands outwardly so that its outer surface presses against the inner pipe surface, thus sealing the pipe. The body member and seal member remain enjoined by means of their mating thread structure. When desired, the plug body member can be turned out of the sealing member, thus making the pipe and/or its contents accessible by removal of the plug assembly.

SUMMARY OF THE INVENTION

The present assembly relates to a reusable two-piece mechanical plug assembly for pipes used to plug or seal pipe ends, ports, or other pipe portions to allow easy access to the pipeline. The two-piece plug assembly is comprised of a rigid body member and a flexible seal member which are adjoined by a plurality of mating threads, of a predetermined configuration and design. The plug assemblies may be constructed and arranged to fit pipes of different diameters and particularly pipes in a specified diameter range.

The body member of the plug assembly is comprised of a rigid material such as a durable plastic material or the like. The body member includes a top surface from which a grasping portion extends. The grasping member is comprised of a center grip and two thumb wings which extend opposite one another from the center grip. The wing members have a lower height than the center grip member. The center grip is preferably polygonal in shape i.e., square, and extends a predetermined distance upwards from the top flat surface of the plug body to provide an ergonomic grasping portion for easy turning and maneuvering of the plug body. The polygonal shape of the center grip permits a user to maneuver the plug body with their hand or with a tool, such as a wrench. When grasped by a user's hand, the palm is placed over the center grip and pressure is exerted on the opposing wings with the thumb and finger to twist the plug body member into or out of the seal member to thereby seal or remove the plug assembly. The body portion of the plug assembly is hollowed upwardly through the center of the sealing portion and the center grip. This configuration allows the plug body to be economical and lightweight.

The rigid sealing portion of the plug body is generally circular in cross-section and narrows from top to bottom. The outer edge of the sealing portion is threaded to be matingly received by the flexible seal member of the plug assembly. The threads are spaced a predetermined distance, have a predetermined pitch, and are disposed at a predetermined angle. This thread configuration permits a plug assembly of the same design (except for diameter) to be used in a range of pipe diameters.

The sealing member of the two-piece plug body assembly is generally circular in cross-section and is comprised of a sturdy flexible material such as rubber or the like. The seal member is constructed and arranged to receive the threaded sealing portion of the rigid body member. The sealing member is comprised of an outer surface, a threaded inner surface, and a top circumferential lip. The internal threads of the seal member have generally the same spacing, pitch, and angle as the external threads of the rigid body member. The seal member of the plug may be constructed and arranged to fit a specific pipe diameter range. The seal member is generally smaller than the diameter of the pipeline so that it can expand to snugly fit within the pipe end.

To seal a pipe, the sealing member with the rigid body particularly threaded therein is place inside of the pipe until the circumferential lip rests against outer edge of the pipe. The circumferential lip portion abuts the pipe end and prevents the entire seal portion from being pushed into the pipe. The rigid body member is then grasped and twisted or turned into the sealing member. As the rigid body member is matingly received by and turned into the sealing member, the seal member expands radially outward so that its outer surface presses against the inner pipe surface, thus sealing the pipe. The rigid body member and sealing member remain enjoined by the plurality of mating threads. When desired, the plug body can be turned or twisted out of the seal member, making the pipe contents accessible and the seal member may be removed.

These and other benefits of this invention will become clear from the following description by reference to the drawings.

DESCRIPTION OF THE PREFERRED EMBODIMENTS

Figure 1:
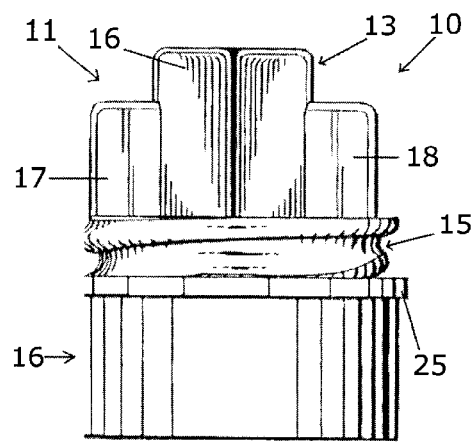
FIG. 1 is an elevational frontal view showing the two piece mechanical plug of the present invention.
Figure 2:
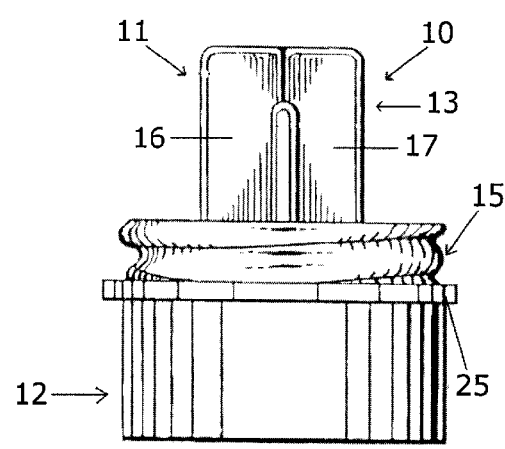
FIG. 2 is an elevational side view showing the two piece mechanical plug of FIG. 1.
Figure 3:
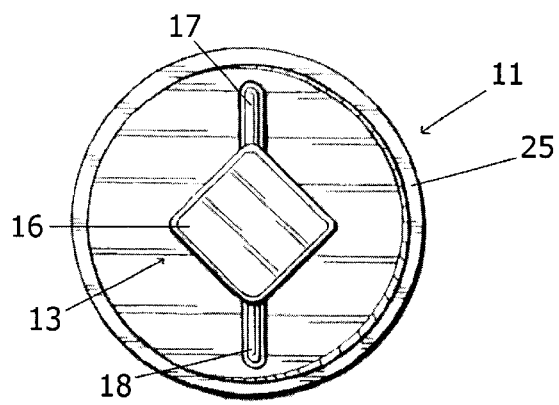
FIG. 3 is a top plan view of the plug of FIG. 1

Referring to FIGS. 1–3, the plug assembly 10 of this invention shows an assembled two piece mechanical plug 10 for pipes. Particularly, the plug assembly 10 of this invention is an economical, reusable plug for plugging pipe ends, or other pipe portions to allow easy access to the pipeline. The plug assembly 10 of this invention is useful in low-pressure pipelines. The plug assembly 10, which may be constructed and arranged to fit various pipe diameter ranges, is comprised of a rigid body member 11 and flexible sealing member 12 and which are adjoined by a plurality of mating threads.

Figure 4:
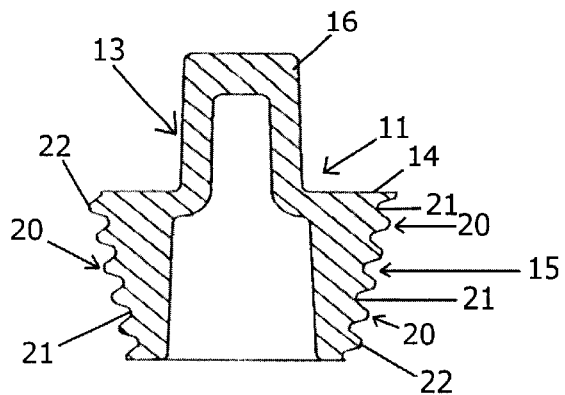
FIG. 4 is a cross-sectional view of the rigid body member of the two piece mechanical plug.
Figure 6:
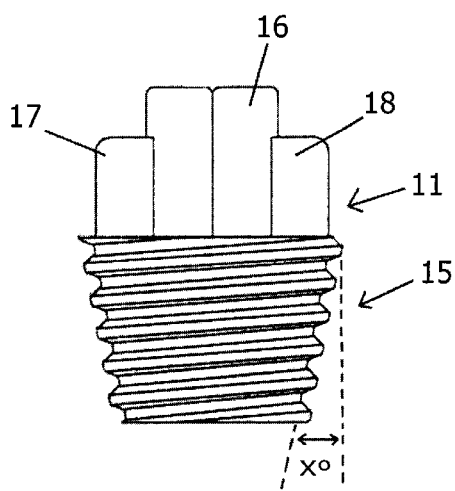
FIG. 6 is a side view of the rigid body member.

As further shown in FIGS. 4 and 6, the rigid body member 11 of the plug assembly 10 is circular in cross-section and is comprised of a rigid material such as a durable plastic material or the like. For example, the plug body may be molded of HDPE or the like. The plug body member 11 is shown to have a grasping portion 13 which extends from the top surface 14 of the threaded sealing portion 15. The grasping portion 13 is further shown having a center grip 16 having planar thumb wings 17 and 18, which are shown opposite one another and extending from opposing corners of the center grip 16. The center grip 16 is shown centrally positioned and has a height greater than that of the planar wings to provide an ergonomic grasping structure for a user's hand. The center grip 16 is preferably polygonal in shape and extends a predetermined distance upwards from the top flat surface 14 to provide a sufficient grasping portion for easy turning and maneuvering of the plug body 11. The polygonal shape, such as a square, of the center grip 16 permits a user to easily handle and maneuver the plug body 11 by hand or with the assistance of a tool, such as a wrench. When grasped by a users hand, the user's palm exerts pressure on the top of the center grip 16 and on the thumb wings 17 and 18 with thumb and finger to turn or twist the plug body member 11 into or out of the sealing member 12.

As shown in FIG. 4, the sealing portion 15 of the plug body member 11 is frustoconical or cone shaped and narrows from top to bottom. The outer surface 19 of the sealing portion 15 has a plurality of threads 20 which are matingly received by the seal member 12. The threaded sealing portion 15 preferably is also constructed of a rigid, durable material such as durable plastic or the like, and it stretches the mating threads of the sealing member 12 over threads 20 in a sealing relationship.

Figure 5:
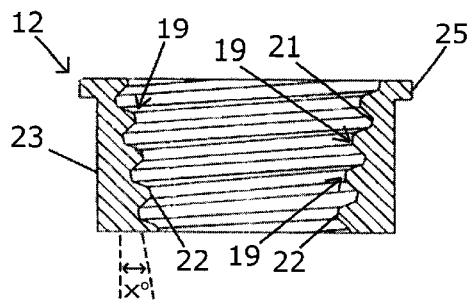
FIG. 5 is a cross-sectional view of the flexible seal member of the two piece mechanical plug.

As further shown in FIG. 5, the flexible sealing member 12 is circular in cross-section and is preferably comprised of a sturdy flexible material such as rubber or the like. The sealing member 12 is constructed and arranged to receive the threaded sealing surface 19 of the body member 11. The sealing member 12 is shown comprised of a smooth outer peripheral surface 23, a threaded inner surface 19, and a top circumferential lip 25. The top lip 25 is used to abut the plug assembly 10 against the end of a pipeline. The seal member 12 may be constructed of natural rubber having a Shore A durometer reading of approximately 50. The latter rubber construction has been found to yield desirable performance in plug operation and sealing in pipelines of various constructions.

As shown in FIGS. 5 and 6, the threads of both the sealing portion 15 of the rigid body member 11 and the threads 19 of the flexible sealing member 12 have a plurality of outer surfaces 22 and inner recesses 21. Each of the outer thread surfaces 22 and inner thread recesses 21 are shown to have a flat configuration. The plurality of threads are also shown spaced at a predetermined pitch and are disposed at a specified angle with respect to a vertical axis.

Figure 7:
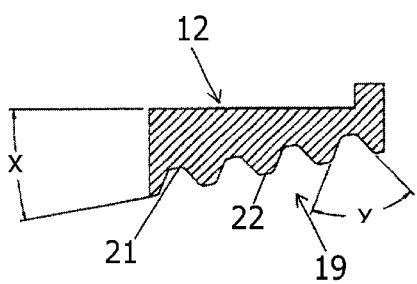
FIG. 7 is an enlarged view showing the internal threads of the flexible seal member.
Figure 8:
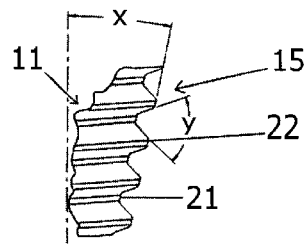
FIG. 8 is an enlarged view showing the external threads of the rigid body member.

As particularly shown in FIGS. 7 and 8, enlarged details are shown of the threads 19 of the flexible seal member 12 and the threads 15 of the rigid body member 11, respectively. As shown, the thread pattern and individual threads are generally the same for each member for mating securement. Importantly, the thread pattern of each member is shown to taper at an angle "x", of approximately 11° with respect to a horizontal axis in FIG. 7 and a vertical axis in FIG. 8. This tapered configuration has been found to provide proper radial expansion of the flexible seal member 12 by the turning insertion of the rigid body member 11 in the pipe diameter ranges for which the mechanical plug assemblies 10 are designed. For example, because of inside diameter and wall thickness variations in the various pipe constructions in which the plug assemblies 10 are used, it has been found that such expansion is desired. Further, the plug assembly 10, except for changes in diameter, will operate in a pipe diameter range of 1½ to 4 inches.

Further shown, the threads 15 and 19 have a configuration whereby each thread has a flat recess 21 between the flat outer thread surfaces 22. Further, each thread is shown to have an angled opening "y" which in cross-section is approximately 64°. The transition between the respective flat surfaces of the threads have a radii of approximately 0.025 inches. This cooperating thread configuration between the rigid body member 11 and flexible seal member 12 has been found to produce an efficient and effective two piece mechanical plug design.

For mechanical plugs described above and having the thread configuration as discussed, it has been found that a thread height of approximately 0.10 inches, a thread inner and outer surface flat area being approximately 0.035 inches wide and a thread spacing of approximately 0.25 inches is suitable for the thread configurations for the sealing member 12 and the rigid body member 11 shown in FIGS. 8 and 9.

In operation and to seal a pipe, the mechanical plug assembly 10 with the seal member 12 and the body member 11 partially threaded therein, is placed inside of a pipe end until the lip 25 of the seal member 12 abuts or rests against the outer pipe edge. The plug body member 11 is then grasped and turned further into the sealing portion 12. As the rigid plug body 11 is received by the seal member 12, its flexible body expands radially outward so that its outer surface 23 presses against the inner pipe surface, thus sealing the pipe. The plug body member 11 and sealing member 12 remain enjoined by a plurality of mating threads 19 and 20, as described above. When desired, the plug body 11 can be turned or twisted out of the seal member 12, thereby, making the pipeline accessible for fluid flow, for example.

As many changes are possible to the embodiments of this invention utilizing the teachings thereof, descriptions above, and the accompanying drawings should be interpreted in the illustrative and not in the limited sense.

That which is claimed is:

1. A mechanical plug assembly comprising:
   a) a rigid body member having an upper grasping portion and a bottom threaded sealing portion, said threaded sealing portion being generally of a conical configuration and having threads of a predetermined configuration extending therefrom;
   b) a flexible sealing member being generally of a hollow cylindrical configuration and having an inside wall and an outside wall; said inside wall having a threaded pattern disposed therein, said threaded pattern having a thread configuration being generally the same as said predetermined thread configuration of said rigid body member; and
   c) said upper grasping portion further comprising a center grip member having a polygonal cross sectional configuration, a height and opposing corners and a thumb wing member extending from each said opposing corner of said center grip member, each said thumb wing member having a height which is less than said height of said center grip member, whereby said center grip member may be engaged by a tool above said thumb wing member or grasped by a user's hand thereby allowing a user's hand to exert pressure on said center grip and the thumb and finger to engage the center grip and thumb wing members to turn said rigid body member into or out of said flexible sealing member.

2. The mechanical plug assembly of claim 1 wherein said plug assembly is constructed and arranged whereby changes in the diameters of the rigid member and the flexible sealing member allow said assembly to seal pipes having a diameter ranging from 1½ to 4 inches.

3. The mechanical plug assembly of claim 1 wherein said rigid body member is molded of a plastic composition and wherein flexible sealing member is molded of a rubber composition.

4. The mechanical plug assembly of claim 1 wherein said flexible sealing member has a circumferential lip extending outwardly from the top thereof.

5. The mechanical plug assembly of claim 1 wherein said threads of said rigid body member have outer surfaces and inner recesses that are flat.

6. The mechanical plug assembly of claim 1 wherein said threads of said rigid body member and said threads of said flexible sealing member are tapered in cross section and wherein said taper from top to bottom is at an angle of approximately 11 degrees.

7. The mechanical plug assembly of claim 6 wherein said tapered threads are used for plug assemblies adapted to seal pipes having diameters ranging from one and a half to four inches.

8. The mechanical plug assembly of claim 6 wherein each said threads have a spacing therebetween and wherein said spacing is angled in cross-section approximately 64° and wherein said threads have transition areas in cross-section which are rounded at a radii of approximately 0.025 inches.

9. A two piece mechanical plug assembly for sealing low pressure pipelines, comprising:
   a) a rigid body member having an upper portion constructed and arranged for turning said rigid body member and a lower portion extending from said upper portion, said rigid body member having a generally flat surface separating said upper portion from said lower portion, said lower portion further having a generally frustoconical surface with a plurality of threads thereon, said threads being of a predetermined configuration, said upper portion further having turning means that may be engaged by a tool and by the hand of a user, said turning means being comprised of a generally square extension member disposed upwardly from generally the center of said flat surface, said generally square extension member having a wing portion extending from opposing corners, said opposing wings extending upwardly from said flat surface a lesser distance than said square extension member;
   b) a flexible and cylindrical sealing member having a conical bore therethrough, said cylindrical sealing member having a height, a top, a bottom, and outside circumferential wall to sealingly engage the interior of the pipeline, said conical bore having a surface with a plurality of threads thereon, said threads being of generally a matching configuration as said predetermined configuration of said plurality of threads of said lower portion of said rigid body member;
   c) said frustoconical surface of said rigid body member and said surface of said conical bore of said sealing member each having a taper extending from top to bottom; and
   d) wherein said threads of said rigid body member and said sealing member have a thread spacing and wherein said thread spacing is angled in cross section and wherein said threads have rounded transition areas between said threads, whereby said tapered frustoconical body member configuration having said thread configuration provides a two piece mechanical plug assembly to seal a pipeline.

10. The mechanical plug assembly of claim 9 wherein said predetermined thread configuration of said rigid body member and said sealing member have a continuous flat outer surface and a continuous flat inner recess for sealingly mating said rigid body member into said sealing member.

11. The mechanical plug assembly of claim 9 wherein said rigid body member has a generally hollow interior and is molded of a plastic composition and wherein said flexible sealing member is molded of a rubber composition.

12. The mechanical plug assembly of claim 11 wherein said flexible sealing member has a Shore-A durometer reading of approximately 50 and wherein said flexible sealing member has a circumferential lip extending outwardly from its top portion.

13. A mechanical plug assembly for sealing pipes comprising:
 a) a sturdy, flexible sealing member capable of radially expanding in a specified diameter range and further having:
  1) an exterior the cross sectional shape of which is circular and having a smooth outer surface for engaging the interior wall of a pipe;
  2) a frustoconical hollow area axially traversing said sealing member;
  3) an internal surface having threads for receiving and engaging a rigid body member; and
  4) an outer circumference having a lip on one end thereof;
 b) a rigid body member for inserting into the sealing member and causing said sealing member to radially expand outward, said rigid body member further having:
  1) a top surface having a polygonal center grip extending upwardly therefrom;
  2) opposing thumb wings extending upwardly from said polygonal center grip, said opposing thumb wings extending upwardly from said top surface a distance less than that of said center grip;
  3) an external surface the cross sectional shape of which is circular and the axial shape of which is frustoconical pointing away from said top surface; and
  4) a threaded sealing portion on said external surface for mating and sealingly engaging said sealing member, whereby said center grip of said rigid body member is constructed and arranged to be engaged by a tool and by the hand of a user.

14. The mechanical plug assembly of claim 13, wherein the threads of said sealing member and the rigid body member have surfaces and recesses that are flat and further having a taper of approximately 11°, recesses between the surface openings of approximately 64° in cross section, and transitions between said surfaces and recesses of a radius of approximately 0.025 inches.

15. The mechanical plug assembly of claim 13, wherein said rigid body member further has a hollow area through said sealing portion and partially into said center grip.

16. The mechanical plug assembly of claim 13, wherein said rigid body member is fabricated of a rigid material such as a durable plastic or similar material.

17. The mechanical plug assembly of claim 13, wherein said sealing member is fabricated of a flexible, expandable, natural rubber having a Shore A durometer reading of approximately 50.

18. A method for sealing an open end of a pipe, said method comprising:
 a) providing a mechanical plug assembly comprising:
  1) a sturdy, flexible sealing member capable of radially expanding in a specified diameter range; and having
   a) an exterior having a transverse cross-sectional shape that is circular;
   b) a frusticonical hollow axially traversing said sealing member; and
   c) an internal surface having threads of a predetermined configuration extending therefrom;
  2) a rigid body member for inserting into the sealing member and causing the sealing member to expand radially outwardly; and having
   a) a top surface having a polygonal center grip extending upwardly therefrom;
   b) opposing thumb wings extending from opposite vertical edges of said center grip, wherein said thumb wings extend upwardly from said top surface a lesser distance than said center grip extends;
   c) an external surface having a transverse cross-sectional shape that is circular and an axial shape that is frustoconical and pointing away from said top surface; and
   d) a threaded sealing portion on said external surface, wherein said threaded sealing portion has a thread configuration that is generally the same as said thread configuration of said sealing member; and wherein said threaded sealing portion engages said threads of said sealing member to thereagainst create a seal and cause said sealing member to expand radially outwardly; and
 b) inserting said sealing member into an open pipe end so that the end for receiving said rigid body member is protruding outwardly; and
 c) engaging said center grip and said opposing thumb wings and turning said rigid body member into said sealing member, thereby causing said sealing member to expand radially outwardly and seal the pipe.

19. The method of claim 18, further comprising providing a flexible sealing member having a circumferential lip and inserting the sealing member into the open pipe end until said circumferential lip of the sealing member contacts and abuts the open pipe end.

20. The method of claim 18, further comprising inserting the rigid body member partially into the flexible sealing member before the sealing member is inserted into the open pipe end.

21. The method of claim 18, further comprising using a tool for grasping said center grip of said rigid body member and applying force thereon to turn said rigid body member further into or out of said sealing member.

22. The method of claim 18, further comprising grasping said opposing wings of said rigid body member with the thumb and/or fingers and applying force thereon to turn said rigid body member further into or out of said sealing member.

* * * * *